Dec. 14, 1926.  B. B. LEUSTIG  1,610,866

SPRING COVER

Filed April 29, 1925   2 Sheets-Sheet 1

Inventor
Benno B. Leustig
By Bates, Macklin, Gobrick & Teare
Attorneys

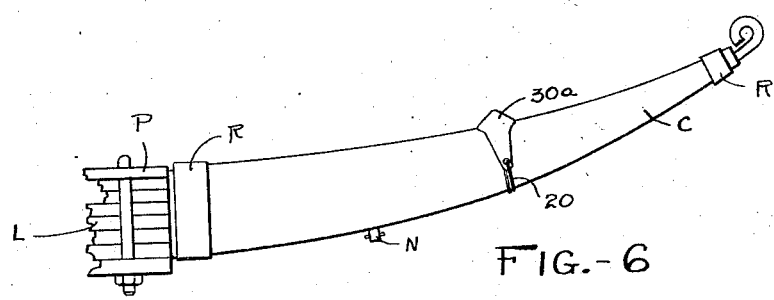
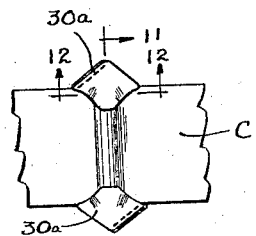
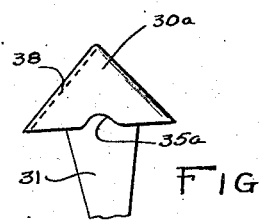
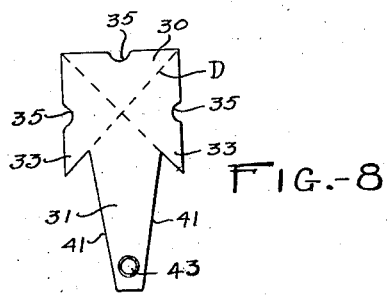
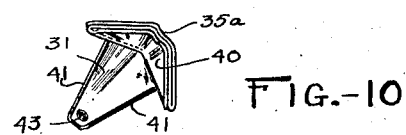
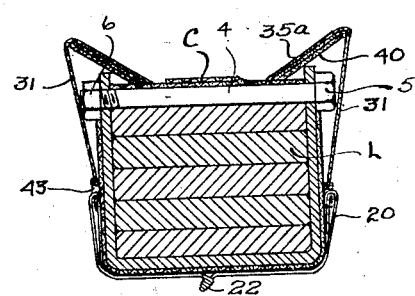
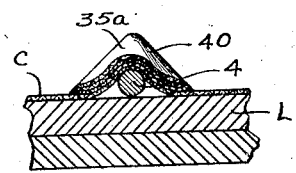

Patented Dec. 14, 1926.

1,610,866

UNITED STATES PATENT OFFICE.

BENNO B. LEUSTIG, OF CLEVELAND, OHIO.

SPRING COVER.

Application filed April 29, 1925. Serial No. 26,621.

This invention relates to covers for automobile leaf springs. These springs are usually provided with U-shaped clips secured by bolts for holding the leaves of the spring against transverse relative shifting. When fabric or leather covers are used on the springs, it is frequently desirable to cut holes in the spring cover in the region of the bolt head or nut, allowing the head or nut and a portion of the clip to protrude through the cover, otherwise, the clip must either be removed or a specially tailored cover must be used which has protuberances for accommodating the protruding members. To remove the clips would allow the individual leaves to shift somewhat and become skewed; while to form the cover so that it would take in the protruding members and yet fit the spring closely throughout its entire extent would result in a very expensive cover.

It is an object of my invention to provide easily formed individual caps or covers for closing the incision through which the protruding members extend, which will seat evenly on the spring cover adjacent the incision along the side and top or bottom surfaces, as the case may be, of the spring cover.

A further object is to provide pairs of individual interchangeable caps for closing the incisions at both ends of the clip which pair of caps may be securely held in place by a single member connecting the two caps and extending across only one face of the spring.

Another object is to provide a device for concealing the protruding ends of a spring clip and covering the incision which may be held in place against transverse movement by the protruding ends of clips.

It is a specific object to provide individual caps or covers for the clip which may be easily formed of folded and stitched fabric material, and which may be easily held on the spring cover by the cooperation of the ends of the clip and simple securing means extending along the side of the spring opposite the side from which the ends of the clip protrude.

Figure 1:
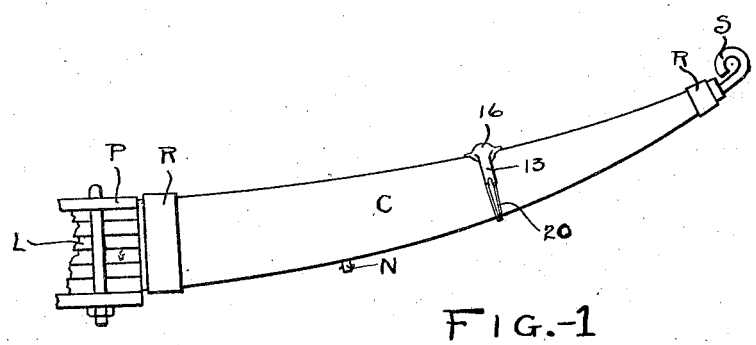
Figure 2:
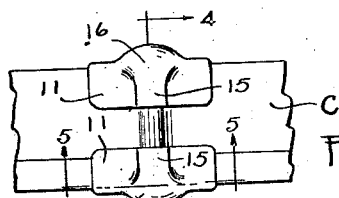
Figure 4:
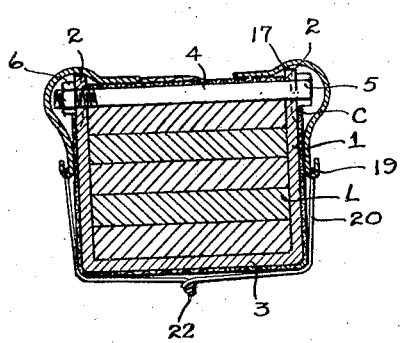
Figure 3:
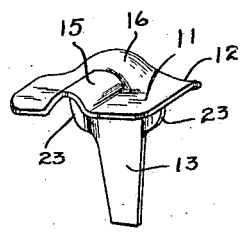
Figure 5:
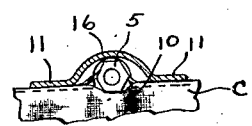

In the drawings Fig. 1 is a side elevation of an automobile leaf spring showing my preferred form of clip cover or cap in place; Fig. 2 is a fragmentary plan of a portion of a spring showing a pair of caps in place; Fig. 3 is a perspective view of my preferred cap; Fig. 4 is a transverse section through the spring as indicated by the lines 4—4 in Fig. 2; Fig. 5 is a longitudinal section taken along the line 5—5 on Fig. 2; Fig. 6 is a side elevation of a spring showing a modified form of my cap in place; Fig. 7 is a fragmentary plan similar to Fig. 2 with the modified form of cap; Fig. 8 is a blank from which one of the fabric caps may be formed; Fig. 9 is a fragmentary side elevation of the folded and stitched cap; Fig. 10 is a perspective view showing the pocket formed by the folded blank; Fig. 11 is a cross-section as indicated by the lines 11—11 in Fig. 7; Fig. 12 is a longitudinal section as indicated by the lines 12—12 in Fig. 7.

In its preferred form, my clip and clip-bolt head cap is formed of sheet metal and has portions thereof bent into intersecting planes, the marginal edges of each portion being adapted to engage the spring cover. At the intersection the cap has an inwardly facing pocket for accommodating the upper end of the clip and the clip securing bolt head or nut.

The invention is primarily for use with a spring cover adapted to be made from fabric or flexible material of a like nature which may be tailored to closely fit the leaf springs of different makes of cars and which may be retained thereon in any convenient manner, such for instance, as by lacing, by the use of devices similar to glove snaps or by the use of the loops such as shown in my prior application filed February 28, 1925, Serial No. 12,247.

Such a cover is shown at C in Fig. 1 as extending from the shackle eye S of the spring along the laminated leaves L to a point near the spring saddle or mounting plate E and as provided with reinforcing clamping members at either end thereof, such as shown at R. At one side of the spring the cover may have a lubricating valve or nipple N, leading within the cover and fastened to the material forming the cover in any suitable manner such as that shown in my prior application.

A common form of spring clip is shown in Fig. 4 at 1 having side members 2 and a connecting portion 3. In order to provide for easily assembling such a clip on the spring, it is generally made U-shaped as shown the free ends being perforated and provided with a through bolt such as indicated at 4, having a head and nut 5 and 6.

In order that the cover may fit the spring as snugly as possible so that lubricant forced into the cover may be distributed evenly and whereby pockets in the body of the cover may be eliminated, it has been found desirable to cut the material forming the cover as shown at 10 in Fig. 5, allowing a portion of the clamp and the nut or head of the bolt to protrude through. This practice would of course, without some covering means for the opening permit the entrance of dust and foreign matter into the interior of the cover, as well as permit the escape of some of the lubricant therefrom. The provision whereby I overcome these objections to so cutting the cover forms the subject matter of this invention.

My preferred metal cap as shown in Figs. 1 to 5 comprises a substantially flat member 11 shown as bent substantially at right angles at 12 to provide a leg portion 13. The portion 11 engages the top or bottom of the spring and the leg extends downwardly over the side thereof. In the region of the bend, I have shown the member as provided with a circular recess 15 terminating in a rounded pocket 16 which extends downwardly beyond the bend to provide room for the bolt head or nut. The interior of this rounded portion 16 as shown in Fig. 4 may engage the upper end of the clamp at 17 and it will be easily understood that by pulling the leg member 13 along the edge or side of the spring, the engagement at 17 will not only prevent the transverse movement of the cap away from the spring but will tend to cam the cap inwardly so that the leg is forced toward the spring.

To effect such a pull I provide a hook 19 on the lower end of the leg preferably bent from the body of the strip and this hook may be engaged by a loop of wire 20 such as shown in Fig. 4 which may extend over the side of the spring opposite that engaged by the portion 11 of the cap. I have shown a pair of covers maintained in position by the use of a single loop, the ends of the loop being twisted together as at 22 or held in any convenient manner.

It will be noted that the cap is formed to press evenly on the cover adjacent the rounded pocket, and in furtherance of this purpose I have shown the cap as provided with flanged portions 23 which may extend along the side of the spring a sufficient distance to form a complete closure for the pocket on either side of the clamp. The lower edges of the flanges as shown curving upwardly around the clamp in close engagement with the cover C throughout their extent. The upper portion of the cover is adapted to press snugly against the spring cover both by reason of the flat portions 11 and by reason of the circular portion 15 extending over the bolt.

From the foregoing it will be understood that caps made in accordance with my invention may be interchangeably used on either side of the spring and moreover may be made exactly alike for a great number of designs and sizes of springs, while by reason of the unitary character of the caps the manufacture thereof is very well adapted for quantity production.

The modified form of my invention preferably comprises a single piece of fabric material such as medium weight cotton suitably coated or impregnated with any desirable waterproofing composition which may be cut on the pattern such as illustrated in Fig. 8 and which comprises a rectangular member 30 and a leg portion 31. The rectangular portion is theoretically a square. The pointed portions 33 being formed from projections of diagonals D along which the rectangular member is folded as shown in Fig. 9 to form the completed cover. The rectangular portion is folded once along each diagonal, the circular cut away portions 35 on each side and at the end of the rectangular member becoming superimposed when folded as shown in Fig. 9 at 35ᵃ. The folded cap is now stitched as shown at 38 along the superimposed edges of the first fold.

A pair of caps or covers such as just described fit over the protruding ends of the spring clips in substantially the same manner as do the formed metal caps, the material itself holding the covers in the tent shape shown in Fig. 11 while the circular cut-out portion 35ᵃ engages the spring cover as it passes over the bolt 4. Fig. 12 shows the manner in which the inner layer 40 forming a portion of the cap engages the fabric cover C on both sides of the bolt as well while on the side of the spring, the margins 41 of the leg portions are drawn by the pull on the leg into contact with the cover on either side of the clamp thereby entirely closing the aperture in the cover C against the escape of lubricant and the ingress of dust. The modified form of cap may be secured to the spring as before, means such as reinforced eyelets 43 being provided near the ends of the leg portions 31 for receiving the wire loop or fastening means 20.

It will be seen that I have provided an extremely simple and cheap clip and bolt head cap for the purpose set forth which may be easily formed of a single piece of material and which will serve to retain lubricants, and in which the pocket is amply sufficient for housing the bolt head and the protruding end of the clip yet which is at the same time small enough that only a very small amount of lubricant would become ineffective by reason of filling the pocket.

Moreover by reason of the caps only engaging one end of the clamp, considerable material is saved and should it become necessary to replace a damaged cap, the other cap may be left in place on the cover, the damaged one being simply forced over the end of the clip and a new one put into place. In the case of the metal cover the leg is then simply hooked into the loop of the wire 20 and the loop retightened by additional twisting of the ends of the wire at 22.

I am aware that changes may be made in the construction without departing from the spirit of my invention and I do not therefore wish to limit myself to the exact forms shown and described.

Having thus described my invention, I claim:

1. In a device of the character described, in combination with a spring cover having incisions therein, a spring retaining clip having portions projecting through the incisions, two separate interchangeable cap members for closing the incisions adapted to fit over the projecting portions, said cap members having marginal portions closely engaging two adjacent surfaces on the cover and means extending along one of said surfaces and adapted to exert a pull on the cap member for holding the members in place.

2. In a device of the character described, in combination with a spring and a fabric cover therefor said cover having incisions therein, a U-shaped clip extending along three sides of the spring and having end portions projecting through the cover, a pair of interchangeable cap members for closing the incisions, each adapted to fit over one of the end portions, each cap being held in place against transverse movement by its respective end portion and means for connecting the caps adapted to cooperate with the projecting portions to hold both cap members in place.

3. In combination with an automobile spring, a cover for the spring having openings and a clip engaging the spring, said clip having portions thereof projecting through the openings in the cover, a cap member adapted to fit over one of the projecting portions arranged to closely and completely embrace the cover immediately adjacent the projection on one surface of the spring and having a leg portion adapted to extend transversely along the side adjacent said surface of the spring to completely close the opening and means for holding the cap in place, said means including the projecting portion of the clip and a member engaging the leg portion of the cap.

4. In combination with a spring and a cover therefor, a member carried by the spring having a part thereof projecting through the cover, separate cap members each engaging two adjacent respective sides of the cover, the marginal edges of said cap members fitting closely against the cover in the region of the projecting part and adapted to engage and conceal the said part and means extending along a third side of the cover secured to a portion of the cap members and cooperating with the part to secure the cap members in place.

5. In combination with an automobile spring, a cover adapted to surround the spring, a clip secured to the spring and having portions thereof extending through the cover at the corners adjacent one side of the spring and a bolt having its intermediate portion concealed by the cover for connecting said clip portions, caps fitting over each of the extending portions and having marginal portions thereof closely engaging the side surfaces adjacent said corners, a portion of the margin adapted to press the cover into close engagement with the intermediate portion of the bolt and a member adapted to connect the caps and to draw all the marginal portions into engagement with their adjacent respective surfaces of the cover.

6. In combination with an automobile leaf spring, a cover therefor adapted to embrace the spring, a clip secured to the spring and having portions thereof protruding through the cover, a cap member adapted to engage the protruding portion, said member being formed of a single strip of material having the marginal edges thereof extending along the cover adjacent one of the protruding portions in the region of the corner of the spring, a securing member integrally formed with the cap member and extending from one of the marginal portions, an anchoring device carried thereby, and a loop engaging the device and extending over a third side of the spring for holding said cap member in place.

7. In combination with a spring substantially rectangular in cross-section, a cover therefor adapted to surround the spring, a clip contained by the cover and secured to the spring, said clip having portions thereof extending through the cover at the corners of the spring, a cap overlying one of said portions and adapted to be held in place thereon against transverse movement in one direction relative to the spring by one of said portions, said member having the marginal edges thereof closely engaging two adjacent intersecting surfaces of the spring cover in the immediate region of one of the said portions and being prevented from transverse movement in the other direction by said engagement of one of the surfaces.

8. In combination with an automobile spring, a cover therefor, a clip embracing the spring and projecting through the cover, said cover having incisions to permit such projecting individual caps for covering the incision, one for each incision and the portion of the clip which projects therethrough, a member formed of a single piece of folded material adapted to engage the clip and means including a portion of the cap extending along the side of the spring for holding the cover in place, said means also including the engagement of the inner surfaces of the cap by the clip.

9. In combination with an auto spring, a cover therefor, a member secured to the spring and having a portion thereof projecting through the cover, a cap having a pocket portion, said pocket being adapted to be formed from a member of substantially rectangular shape, the pocket member being folded along the diagonals of the rectangle and two of the superposed marginal edges being secured together and means including the engagement of the cap with the projecting portions for retaining the cap in engagement with the spring cover.

10. In combination with an auto leaf spring, a cover therefor, a retaining member embracing the spring and having portions thereof extending through the cover at the corners of the spring formed by the intersecting side surfaces thereof, a cap formed from a single piece of material having a portion thereof forming a theoretic square, said square being adapted to be folded substantially along the diagonals and the material being retained in folded condition, and means including the engagement of the spring retaining member by the cap for holding the cap in place on the spring.

In testimony whereof, I hereunto affix my signature.

BENNO B. LEUSTIG.